(12) United States Patent
Melville et al.

(10) Patent No.: US 8,105,559 B2
(45) Date of Patent: Jan. 31, 2012

(54) THERMALLY REGENERABLE NITRIC OXIDE ADSORBENT

(75) Inventors: Joanne Elizabeth Melville, Dry Drayton (GB); Robert James Brisley, Duxford (GB); Orla Keane, Cambridge (GB); Paul Richard Phillips, Royston (GB); Elizabeth Hazel Mountstevens, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 12/446,346

(22) PCT Filed: Oct. 19, 2007

(86) PCT No.: PCT/GB2007/050648
§ 371 (c)(1),
(2), (4) Date: Feb. 8, 2011

(87) PCT Pub. No.: WO2008/047170
PCT Pub. Date: Apr. 24, 2008

(65) Prior Publication Data
US 2011/0274606 A1 Nov. 10, 2011

(30) Foreign Application Priority Data

Oct. 20, 2006 (GB) ................... 0620883.9
Jul. 17, 2007 (GB) ................... 0713869.6

(51) Int. Cl.
*B01D 53/56* (2006.01)
*B01D 53/94* (2006.01)
*F01N 3/10* (2006.01)

(52) U.S. Cl. ............... 423/213.2; 423/213.5; 423/213.7; 423/239.1; 60/282; 60/297; 60/299; 60/301

(58) Field of Classification Search ............... 423/213.2, 423/213.5, 213.7, 239.1; 60/282, 297, 299, 60/301
See application file for complete search history.

(56) References Cited

U.S. PATENT DOCUMENTS 5,656,244 A  8/1997  Cole
(Continued)

FOREIGN PATENT DOCUMENTS

EP  0 560 991 B9  9/1993
(Continued)

OTHER PUBLICATIONS

Satoh et al., "Ein SCR NOx-Reduktionssystem für Mager- and Fettbetrieb mit Ammoniakspeicher," 15. Aachener Kolloquium Fahrzeug- and Motorentechnik 2006 ("A NOx Reduction System Using Ammonia Storage-Selective Catalytic Reduction in Rich and Lean Operations," presented at the 15th Aachen Colloquium, Automobile and Engine Technology, Oct. 4-11, 2006), pp. 1-10.

(Continued)

*Primary Examiner* — Timothy Vanoy
(74) *Attorney, Agent, or Firm* — Kevin M. Carroll; RatnerPrestia (57) ABSTRACT

A method of reducing nitrogen oxides ($NO_x$) present in a lean gas stream comprising nitric oxide (NO) comprises the steps of: (i) net adsorbing NO per se from the lean gas stream in an adsorbent comprising palladium and a cerium oxide at below 200° C.; (ii) thermally net desorbing NO from the NO adsorbent in a lean gas stream at 200° C. and above; and (iii) catalytically reducing $NO_x$ on a catalyst other than the NO adsorbent with a reductant selected from the group consisting of a hydrocarbon reductant, a nitrogenous reductant, hydrogen and a mixture of any two or more thereof. A system for carrying out such a method is also disclosed.

20 Claims, 9 Drawing Sheets

U.S. PATENT DOCUMENTS

| | | | | |
|---|---|---|---|---|
| 6,471,923 | B1 * | 10/2002 | Becue et al. | 423/213.2 |
| 6,546,717 | B1 * | 4/2003 | Chandler et al. | 60/274 |
| 2003/0072694 | A1 | 4/2003 | Hodgson et al. | |

FOREIGN PATENT DOCUMENTS

| | | |
|---|---|---|
| EP | 0 602 865 A1 | 6/1994 |
| EP | 1 027 919 A2 | 8/2000 |
| EP | 1 054 722 B1 | 11/2000 |
| EP | 1 057 519 A1 | 12/2000 |
| EP | 1 203 611 A1 | 5/2002 |
| EP | 1 276 549 B1 | 1/2003 |
| EP | 1 599 892 A1 | 8/2005 |
| JP | 2722987 B2 | 3/1998 |
| WO | WO-00/29726 A1 | 5/2000 |
| WO | WO-01/12320 A1 | 2/2001 |
| WO | WO-2004/025093 A1 | 3/2004 |
| WO | WO-2004/025096 A1 | 3/2004 |
| WO | WO-2004/030798 A1 | 4/2004 |
| WO | WO-2004/076829 A1 | 9/2004 |
| WO | WO-2004/079170 A1 | 9/2004 |

OTHER PUBLICATIONS

Cordatos et al., "CO, NO, and $H_2$ Adsorption on Ceria-Supported Pd," *Journal of Catalysis*, 1996, vol. 159, pp. 112-118.

Kasoka, S. et al., "Effect of Inlet $NO/NO_2$ Molar Ratio and Contribution of Oxygen in the Catalytic Reduction of Nitrogen Oxides with Ammonia," *Nippon Kagaku Kaishi*, 1978, No. 6, pp. 874-881.

Erlandsson et al., "Hydrocarbon (HC) Reduction of Exhaust Gases from a Homogeneous Charge Compression Ignition (HCCI) Engine Using Different Catalytic Mesh-Coatings," *SAE Technical Paper Series*, Paper No. 2000-01-1847, presented at CEC/SAE Spring Fuels & Lubricants Meeting & Exposition, Paris, France, Jun. 19-20, 2000.

* cited by examiner

THERMALLY REGENERABLE NITRIC OXIDE ADSORBENT

CROSS-REFERENCE TO RELATED APPLICATIONS

This application is the U.S. National Phase application of PCT International Application No. PCT/GB2007/050648, filed Oct. 19, 2007, and claims priority of British Patent Application No. 0620883.9, filed Oct. 20, 2006, and British Patent Application No. 0713869.6, filed Jul. 17, 2007, all of which are incorporated herein by reference.

FIELD OF THE INVENTION

The present invention relates to a method of reducing nitrogen oxides ($NO_x$) present in a gas stream comprising nitric oxide (NO), and to a system for carrying out such a method.

BACKGROUND OF THE INVENTION

Undesirably, $NO_x$ can be produced in a variety of processes including combustion processes. For example, $NO_x$ is produced by internal combustion engines (whether mobile or stationary), gas turbines and coal- or oil-fired power plants, refining processes, by refinery heaters and boilers, furnaces, by processes of the chemical processing industry, by coke ovens, municipal waste plants and incinerators, coffee roasting plants etc.

One method of treating $NO_x$ in an exhaust gas of an internal combustion engine is to absorb the $NO_x$ from a lean gas in a basic material and then to desorb the $NO_x$ from the basic material and reduce it using a stoichiometric or rich gas. Such a method is disclosed in EP 0560991. In EP 0560991, a $NO_x$ absorbent comprises alumina supporting a basic material such as an alkali metal, alkaline earth metal or a rare earth metal and a precious metal, such as platinum. The mechanism described in EP 0560991 for $NO_x$ absorption from an oxygen-rich gas is that oxygen ($O_2$) is deposited on the surface of the platinum in the form of $O_2^-$ and nitric oxide (NO) in the gas reacts with the $O_2^-$ on the surface of the platinum and becomes $NO_2$ ($2NO+O_2 \rightarrow 2NO_2$). According to the mechanism described, subsequently, a portion of the $NO_2$ is oxidized on the platinum and is absorbed into the absorbent, e.g. barium oxide (BaO). While bonding with the BaO, the $NO_x$ is diffused in the absorbent in the form of nitric acid ions $NO_3^-$. The description explains that whilst the mechanism is explained by using platinum and barium loaded on the carrier, "a similar mechanism is obtained even if another precious metal, alkali metal, alkali earth metal, or rare earth metal is used". This combination of a basic material for such as an alkali metal, alkaline earth metal or a rare earth metal and a precious metal, such as platinum and possibly also a reduction catalyst component such as rhodium is typically referred to as a $NO_x$ trap or a $NO_x$ absorber catalyst (NAC).

WO 2004/030798 discloses an exhaust system for a diesel engine comprising a $NO_x$ absorbent component, which is devoid of platinum, followed by a $NO_x$-trap comprising at least one $NO_x$ absorbent and platinum. The platinum-free $NO_x$ absorbent component can be selected from alkaline earth metal (calcium, magnesium, strontium and barium are mentioned) compounds, alkali metal (e.g. potassium and/or caesium) compounds and rare earth metal (such as cerium, yttrium or praseodymium) compounds. The platinum-free $NO_x$ absorbent can be supported on a suitable support, such as particulate alumina, silica, zirconia, titania, ceria or a mixture or composite oxide of any two or more thereof. Alternatively, the platinum-free $NO_x$ absorbent can comprise the support per se, such as ceria or alumina. In addition to the $NO_x$ absorbent component, the platinum-free $NO_x$ absorbent can include a base metal catalyst for oxidising nitrogen monoxide to nitrogen dioxide in lean exhaust gas, and a manganese compound, a cobalt compound and a copper compound are specifically mentioned.

WO 2004/079170 discloses an exhaust system for a lean burn internal combustion engine comprising a particulate filter, a first $NO_x$ absorbent disposed upstream of the filter and a second $NO_x$ absorbent disposed downstream of the filter. The first $NO_x$ absorbent can be selected to release stored $NO_x$ during lambda>1 conditions at about 300° C. and above and in this regard suitable $NO_x$ absorbent components comprise at least one of cerium, lanthanum, alumina, iron, zinc, calcium, sodium, magnesium and mixtures of any two or more thereof.

EP 1054722 discloses a SCR system for treating combustion exhaust gas containing $NO_x$ and particulates, comprising in combination and in order an oxidation catalyst effective to convert at least a portion of NO in said $NO_x$ to $NO_2$ and enhance the $NO_2$ content of the exhaust gas, a particulate trap, a source of reductant fluid, injection means for such reductant fluid located downstream of said particulate trap and an SCR catalyst.

EP 1559892 discloses an exhaust gas purifying apparatus for an internal combustion engine having an exhaust system. The exhaust gas purifying apparatus includes a catalyst for absorbing $NO_x$ in the exhaust gas. When the air-fuel ratio is set to a value on the rich side with respect to the stoichiometric ratio, absorbed $NO_x$ is reduced to ammonia and the generated ammonia is retained in the catalyst. The catalyst reduces $NO_x$ with the retained ammonia when the air-fuel ratio is returned to a value on a lean side with respect to the stoichiometric ratio. An illustrative catalyst comprises platinum on alumina mixed with ceria ($CeO_2$) or platinum on ceria as a $NO_x$ absorbent in a first layer and a transition-metal ion exchanged zeolite as an ammonia absorbing second layer overlying the first layer (see also "A $NO_x$ Reduction System Using Ammonia Storage-Selective Catalytic Reduction in Rich and Lean Operations", N. Satoh et al. presented at the $15^{th}$ Aachen Colloquium "Automobile and Engine Technology", 9-11 Oct. 2006).

Mercedes has recently announced the launch of the E320 Bluetech™ model in USA. The Dieselnet website report of the launch (available at http://www.dieselnet.com/news/2006/09daimler.php) includes the following explanation:

"While the marketing name "Bluetec" has been derived from the urea—called AdBlue in Europe—selective catalytic reduction (SCR) technology, two different NOx control options are introduced in the Bluetec line-up: a NOx adsorber catalyst (NAC) and urea-SCR. In the 2007 model year, the E320 emission control system includes a close-coupled diesel oxidation catalyst (DOC), followed by the NAC converter, the diesel particulate filter, and an SCR catalyst. The NOx adsorber stores NOx emitted during lean operation, followed by regeneration at a rich exhaust condition, which is periodically achieved through an engine management strategy. Regeneration in diesel NAC catalysts is typically performed at a frequency on the order of 2 minutes, and lasts a few seconds. During the regeneration, the NAC catalyst produces some ammonia, which is stored in the downstream SCR catalyst, and used to further enhance NOx reduction through the SCR reaction."

U.S. Pat. No. 5,656,244 discloses a system for reducing cold start $NO_x$, carbon monoxide and hydrocarbon emissions from mobile source exhaust wherein molecules of $NO_x$ are adsorbed onto a regenerable sorbent material during the ineffective warm-up period of a three-way catalytic converter. When the catalytic converter reaches operating temperatures, the $NO_x$ molecules are thermally desorbed from the sorbent material and delivered to the catalytic converter for effective reduction to molecular nitrogen.

EP 1027919 discloses a system for treating exhaust gases generated from a diesel engine by locating two catalyst components in the engine exhaust gas passage. The first catalyst component which is exposed to oxidising diesel exhaust is located nearest to the engine and is a nitrogen oxide absorbent made of support material carrying precious metal that absorbs nitrogen oxides at low temperature and desorbs them as the temperature is raised during engine operation. The nitrogen oxide absorbent material comprises (a) porous support material selected from the group consisting of alumina, zeolite, zirconia, titania, lanthana and mixtures of any of them and (b) at least 0.1 wt % precious metal selected from the group consisting of platinum, palladium and rhodium or a mixture of any of them based on the weight of a support for the precious metal: platinum carried on alumina is exemplified. The second component is a catalyst such as a lean-$NO_x$ catalyst or a selective reduction catalyst which is capable of converting the exhaust gas passing over it including reducing the nitrogen oxides desorbed from the first component into nitrogen ($N_2$) or nitrous oxide ($N_2O$). Materials such as hydrocarbons or ammonia or urea may be injected into the vicinity of the second catalyst component to aid in the reduction.

EP 1203611 discloses an exhaust gas treatment unit for the selective catalytic reduction of nitrogen oxides under lean exhaust gas conditions which contains at least one catalyst with catalytically active components for selective catalytic reduction (SCR components). The exhaust gas treatment unit is characterised in that the catalyst also contains, in addition to SCR components, at least one storage component for nitrogen oxides ($NO_x$ components). The $NO_x$ storage components preferably contain at least one compound of elements selected from the group consisting of alkali metals, alkaline earth metals and cerium in combination with a nitrogen monoxide oxidation catalyst from at least one of platinum, palladium, rhodium and iridium. Alternatively, or in addition, the catalyst may contain catalytically active components based on support oxides from the group aluminium oxide, silicon dioxide, cerium oxide, zirconium oxide, titanium oxide or mixed oxides thereof catalysed with at least one of the platinum group metals platinum, palladium, rhodium and iridium. Platinum on active alumina is identified as a preferred oxidation catalyst.

WO 00/29726 discloses an apparatus for treating exhaust gas streams, including diesel engine exhaust, which apparatus in one embodiment comprises a catalyst comprising a cerium component and optionally a platinum group metal carried on a flow through monolith substrate followed by a catalysed filter comprising a platinum group metal, a first cerium component and preferably a zirconium component.

WO 2004/025096 discloses a compression ignition engine wherein substantially all fuel for combustion is injected into a combustion chamber prior to the start of combustion, which engine comprising an exhaust system comprising a supported palladium (Pd) catalyst. The supported Pd catalyst may comprise at least one base metal promoter, such as a reducible oxide or a basic metal. The reducible oxide may be an oxide of manganese, iron, cobalt, copper, tin or cerium. The base metal may be an alkali metal, an alkaline earth metal or a lanthanide metal. The catalyst may also comprise a supported platinum component. In an illustrative embodiment, the supported Pd catalyst is palladium supported on ceria ($CeO_2$). A catalyst comprising a physical mixture of Pd/$CeO_2$ and Pt/alumina-based support is also disclosed.

WO 2004/025093 discloses a compression ignition engine operable in a first, normal running mode and a second mode producing exhaust gas comprising an increased level of carbon monoxide relative to the first mode and means when in use to switch engine operation between the two modes, which engine comprising an exhaust system comprising a supported palladium (Pd) catalyst associated with at least one base metal promoter and an optionally supported platinum (Pt) catalyst associated with and/or downstream of the Pd catalyst. The base metal promoter can be any of those disclosed for WO2004/025096 mentioned hereinabove. In one embodiment, the exhaust system comprises a catalyst for catalysing the selective catalytic reduction (SCR) of $NO_x$ with at least one $NO_x$-specific reactant disposed downstream of the supported Pd catalyst. Switching between first and second mode running, thereby to promote an exotherm for heating the SCR catalyst downstream, can be done in order to maintain the SCR catalyst at around its optimum temperature range for $NO_x$ reduction. $NO_x$ specific reactants as described in WO2004/025096 include nitrogenous compounds, for example nitrogen hydride, ammonia, and ammonia precursor e.g. urea, ammonium carbamate and hydrazine.

The SCR catalyst of WO 2004/025096 can comprise the Pt catalyst. Alternatively, the SCR catalyst can be vanadium-based e.g. $V_2O_5$/$TiO_2$; or a zeolite e.g. ZSM-5, mordenite, gamma-zeolite or beta-zeolite. The zeolite can comprise at least one metal selected from the group consisting of Cu, Ce, Fe and Pt, which metal can be ion-exchanged or impregnated on the zeolite. In one embodiment, the means for switching between the two modes switches between the first mode and the second mode when the Pt catalyst is <250° C., e.g. less than 200° C. or less than 150° C.

WO 2004/076829 discloses an exhaust-gas purification system for the selective catalytic reduction of nitrogen oxides. The system includes at least one catalyst having catalytically active components for selective catalytic reduction (SCR components). A $NO_x$ storage catalyst is arranged upstream of the SCR catalyst in the exhaust-gas purification system. For performing the selective catalytic reduction, metering means for supplying a compound decomposable into ammonia is provided between the $NO_x$ storage catalyst and the SCR catalyst. At low exhaust-gas temperatures, the $NO_x$ storage catalyst adsorbs the nitrogen oxides contained in the exhaust gas and desorbs them only at rising exhaust-gas temperatures, so that they can be converted by the SCR catalyst when it is active. The $NO_x$ storage catalyst includes at least one alkaline compound of elements selected from the group consisting of alkali metals, alkaline-earth metals and rare earths which are coated or activated with at least one of the platinum group metals platinum, palladium, rhodium and iridium. The oxidation activity of the catalyst for nitrogen monoxide may be increased further if the $NO_x$ storage catalyst additionally includes catalytically active components based on support oxides selected from the group consisting of aluminium oxide, silicon dioxide, cerium oxide, zirconium oxide, titanium oxide and mixed oxides thereof which are coated with at least one of the platinum group metals platinum, palladium, rhodium and iridium. A particularly preferred $NO_x$ storage catalyst includes a storage component based on cerium oxide coated with platinum and additionally platinum as an oxidizing catalyst on a support based on aluminium oxide.

SAE 2000-01-1847 reports the results of using Pt/$CeO_2$ and Pt/$SnO_2$ for treating HCCI engine exhaust gas.

H. Cordatos et al., Journal of Catalysis 159 (1996) 112-118 report that, in idealised laboratory conditions, NO is adsorbed by ceria-supported palladium and that the vast majority of the adsorbed NO is reduced to $N_2$ in a vacuum with increasing temperature (temperature programmed desorption): minimal NO desorption and $N_2O$ generation is observed.

SUMMARY OF THE INVENTION

We have now discovered, very surprisingly, that a particular adsorbent is more effective than the preferred $NO_x$ storage catalyst disclosed in WO 2004/076829. In particular, we have determined that one reason for this advantage is that the adsorbent adsorbs nitric oxide (NO) per se rather than requiring NO first to be oxidised to nitrogen dioxide.

According to one aspect, the invention provides a method of reducing nitrogen oxides ($NO_x$) present in a lean gas stream comprising nitric oxide (NO), which method comprising the steps of:
(i) net adsorbing NO per se from the lean gas stream in an adsorbent comprising palladium and a cerium oxide at below 200° C.;
(ii) thermally net desorbing NO from the NO adsorbent in a lean gas stream at about 200° C. and above; and
(iii) catalytically reducing $NO_x$ on a catalyst other than the NO adsorbent with a reductant selected from the group consisting of a hydrocarbon reductant, a nitrogenous reductant, hydrogen and a mixture of any two or more thereof.

BRIEF DESCRIPTION OF THE DRAWINGS

In order that the invention may be more fully understood, embodiments thereof and illustrative Examples will be described with reference to the accompanying drawings, in which.

DETAILED DESCRIPTION OF THE INVENTION

As used herein the terms "absorb" and "adsorb" and any derivatives thereof have been used interchangeably, and the specification should be interpreted accordingly.

It is known e.g. from EP 0560991 that $NO_x$ is adsorbed in a suitable $NO_x$ adsorbent as $NO_2$ more readily than NO. However, $NO_2$ preferentially reacts with unburned hydrocarbons in an exhaust gas over a suitable NO oxidation catalyst such as platinum and a light-off temperature (herein defined, unless otherwise stated, as the temperature at which a catalyst catalyses the conversion of NO to $NO_2$ at >50% efficiency) for NO oxidation on the catalyst is generally higher than the exhaust gas temperatures where $NO_x$ control is required. Surprisingly, and in contrast to $NO_x$ adsorbent components such as BaO disclosed in the prior art, our results show that a NO adsorbent comprising palladium and a cerium oxide adsorbs NO per se from a gas stream at relatively low temperatures, so that it is not necessary to include an oxidation catalyst component in an adsorbent to oxidise NO to $NO_2$. We believe that whilst the NO adsorbent for use in the present invention will adsorb $NO_2$ per se as well as NO per se, it does not substantially oxidise NO to $NO_2$.

Furthermore, prior art $NO_x$ adsorbents such as those exemplified in EP 0560991 comprise alkali and alkaline earth metals such as barium, strontium, potassium and caesium and it is well known that nitrates of such metals will thermally decompose in lean internal combustion engine exhaust gas if the temperature of the exhaust gas is high enough, e.g. at about 400° C. and above. However, NO adsorbents comprising palladium and a cerium oxide for use in the present invention are selected so that NO is net desorbed therefrom in lean exhaust gas at temperatures significantly lower than for typical $NO_x$ adsorbent components, i.e. at about 195° C. and above, such as at about 200° C. and above, e.g. at about 210° C. and above, such as at about 215° C. and above or at about 220° C. and above.

Whilst it has been suggested that $NO_x$ can be released from known $NO_x$ adsorbers such as BaO as a mixture of NO and $NO_2$ or $NO_2$ per se, depending on the oxygen content of the gas stream (see for example JP-B-2722987), we have found that NO is desorbed from the NO adsorbent comprising palladium and a cerium oxide almost entirely as NO per se with very little $NO_2$ desorbed at low temperatures. However, at higher temperatures we have seen that $NO_2$ is desorbed, possibly due to oxygen "spillover" from the cerium oxide.

In one embodiment, the NO adsorbent consists of palladium and a cerium oxide or a mixed oxide or composite oxide containing cerium and at least one other transition metal, whereas in another embodiment, the NO adsorbent includes palladium dispersed on ceria or a mixed oxide or composite oxide containing cerium and at least one other transition metal. In a particular embodiment, the at least one other transition metal in the mixed oxide or composite oxide is zirconium.

Suitable palladium loadings in the NO adsorbent can be from 0.1 to 200 g/ft$^{-3}$. In one embodiment, the palladium loading on the cerium oxide or the composite oxide containing cerium is from 0.1 to 200 g/ft$^{-3}$, such as from 0.5 to 150 g/ft$^{-3}$ or 1 to 120 g/ft$^{-3}$.

"Composite oxide" as defined herein means a largely amorphous oxide material comprising oxides of at least two elements which are not true mixed oxides consisting of the at least two elements.

Materials comprising palladium and a cerium oxide can be obtained by known methods including, but not limited to, impregnation, the incipient wetness technique and co-precipitation. Co-precipitated materials can be obtained according to the methods disclosed in EP 0602865 (see also Example 2 hereinbelow).

In another embodiment that can be used, though not exclusively, in treating NO$_x$ emitted from lean-burn internal combustion engines, particularly vehicular engines, the NO adsorbent is combined with a thermally regenerable NO$_x$ adsorbent for net adsorbing NO$_x$ at about 200° C. and above and thermally net desorbing NO$_x$ at about 250° C. and above (i.e. net adsorbing from about 200° C. and above up to below about 250° C.), which thermally regenerable NO$_x$ adsorbent comprising platinum and a metal oxide. In embodiments, the thermally regenerable NO$_x$ adsorbent can comprise platinum dispersed on alumina, ceria and/or zirconia. An advantage of this embodiment is that it enables net NO$_x$ desorption to be to be delayed to higher temperatures (temperatures of about 250° C. and above, such as about 255° C., 260° C., 265° C. or 270° C. and above), at which a relevant NO reduction catalyst (e.g. a selective catalytic reduction catalyst using nitrogenous reductant) is more active (i.e. above light off temperature) for NO reduction, than at temperatures of about 200° C. and above, or which enables ammonia precursors such as urea—which hydrolyses or pyrolyses more readily at higher temperatures—to be used.

In alternative layered arrangements, we believe that in certain circumstances it may be desirable to locate the Pt-containing layer below the Pd—containing layer.

In general, layered systems are more suited to coating flow-through monolith substrate systems than filter substrates, because layered systems can contribute to backpressure problems. In this regard, and in more recent developments, we have determined that it may be advantageous to combine both the Pd—component and the Pt-component in the same washcoat layer, particularly (though not exclusively), where a filter substrate is to be coated. For example, both the Pt and Pd may be carried on CeO$_2$ or a Ce—ZrO$_2$ mixed or composite oxide in a washcoat, which may also comprise other components e.g. alumina. Alternatively, Pd may be pre-fixed onto the CeO$_2$ (or the Ce—ZrO$_2$) and combined in a washcoat with Pt pre-fixed to a separate support, e.g. as Pt/Ce—ZrO$_2$, Pt/CeO$_2$, Pt/ZrO$_2$ or Pt/Al$_2$O$_3$.

The level of sulphur in fuel is falling throughout the world. However, a recognised problem with using CeO$_2$-based components in exhaust systems is that they can become sulphated, reducing their activity. Where the purpose of the CeO$_2$-based component is to adsorb species such as oxygen, hydrogen or NO$_x$ it may be necessary to provide a desulphation regime to counteract the effects of sulphation. It is believed, however, that certain doped ceria-based materials are more easily desulphated and can be used, with advantage, in the present invention. Alternatively, TiO$_2$ and similar materials can be used instead of CeO$_2$.

The NO adsorbent and the thermally regenerable NO$_x$ adsorbent can be disposed in any suitable arrangement that provides this benefit. For example, in one embodiment a flow-through substrate monolith is coated with a zone at an inlet end of the substrate monolith with the NO adsorbent and at an outlet end of the substrate monolith with the thermally regenerable NO$_x$ adsorbent. Alternatively, the NO adsorbent is present in an underlayer on a substrate monolith and the thermally regenerable NO$_x$ adsorbent is present in a layer overlying the underlayer.

Step (ii) and/or step (iii) of the method according to the invention can be done in a net lean gas stream.

Suitable NO reduction catalysts known in the art include lean NO$_x$ catalysts (also known as hydrocarbon-SCR catalysts), which can use hydrocarbon and/or hydrogen as reductant, or a NO$_x$ trap comprising an alkaline earth metal or alkali metal NO$_x$ adsorber component and a NO oxidation catalyst component, suitably comprising platinum, and optionally a NO$_x$ reduction catalyst component, such as rhodium. In a particular embodiment, the step (iii) catalyst is a selective catalytic reduction (SCR) catalyst and the reductant is a nitrogenous reductant. In a particular embodiment, the NO reduction catalyst is platinum free.

According to a second aspect, the invention provides a system for reducing NO$_x$ in a lean gas stream comprising NO, which system comprising an adsorbent for adsorbing NO per se from the lean gas stream at below about 200° C., means for contacting the NO adsorbent with a lean gas stream at about 200° C. and above thereby to desorb NO from the NO adsorbent and means for reducing NO desorbed from the NO adsorbent comprising a NO reduction catalyst and a source of reductant selected from the group consisting of a hydrocarbon reductant, a nitrogenous reductant, hydrogen and mixtures of any two or more thereof, wherein the NO adsorbent comprises palladium and a cerium oxide.

Typically, the NO adsorbent is coated in a washcoat onto at least a portion of the channels of a flow-through substrate monolith, e.g. a ceramic or metal monolith and the substrate monolith is disposed in the system. A flow-through substrate is a honeycomb structure having a plurality of relatively small, parallel channels running axially through the part. However, in certain arrangements, as explained in greater detail hereinbelow, it can be advantageous to coat the NO adsorbent onto at least a portion of a filter substrate, such as a wall flow filter.

In a particular embodiment, the NO reduction catalyst is a selective catalytic reduction catalyst and the reducing agent is a nitrogenous reducing agent.

In a preferred embodiment, the system is an exhaust system for a lean-burn internal combustion engine, wherein the NO adsorbent is located upstream of the NO reduction catalyst or is co-located with the NO reduction catalyst and wherein the exhaust system comprises means for introducing reductant into an exhaust gas either between the NO adsorbent and the NO reduction catalyst or upstream of both the NO adsorbent and the NO reduction catalyst.

In an embodiment wherein the system comprises an exhaust system for a lean-burn internal combustion engine, the NO adsorbent component can be associated with an upstream end of a particulate filter.

A feature of this embodiment is that NO that is released from the NO adsorbent at temperatures of about 200° C. or greater is available to combust particulates collected on the particulate filter. It is also understood that mixtures of NO and NO$_2$ are desirable for NO$_x$ reduction on a SCR catalysts e.g. transition metal/zeolite SCR catalysts as they are more readily reduced to N$_2$ (see for example S. Kasaoka et al. "Effect of Inlet NO/NO$_2$ Molar Ratio and Contribution of Oxygen in the Catalytic Reduction of Nitrogen Oxides with Ammonia", Nippon Kagaku Kaishi, 1978, No. 6, pp. 874–

881). This can be achieved, for example, by locating a NO oxidation catalyst, e.g. a platinum oxidation component, of appropriate activity downstream of the NO adsorbent component. In one embodiment, the Pt oxidation component can be the thermally regenerable $NO_x$ adsorbent comprising platinum and a metal oxide for net adsorbing $NO_x$ at about 200° C. and above and net desorbing $NO_x$ at about 250° C. and above, e.g. Pt/$Al_2O_3$ and/or Pt/$ZrO_2$.

The configuration of the exhaust system can be selected from amongst a number of design options depending upon the intended application. For example, in one embodiment the NO adsorbent is coated on an inlet end of the particulate filter, wherein the reductant introducing means is located downstream of the filter and the NO reduction catalyst is located downstream of the reductant introducing means. In an alternative embodiment, or in addition, the NO adsorbent is disposed on a separate substrate located upstream of the particulate filter, and can form part of a NO oxidation catalyst, e.g. in the arrangement disclosed in EP 1054722, described hereinabove.

The particulate filter can be any suitable for the task, including ceramic wall-flow filters e.g. of cordierite or silicon carbide, sintered metal filters or partial filters such as those disclosed in EP 1276549 or in EP 1057519. In any case, the particulate filter can be catalysed with an appropriate base metal catalyst such as a ceria- or ceria-zirconia-based catalyst and/or contain one or more platinum group metal, typically platinum, palladium or both platinum and palladium.

In a particular embodiment, the filter is coated with the NO adsorbent and the substrate monolith is the particulate filter.

It is known actively to combust soot held on a catalysed soot filter (CSF) by injecting an unburned hydrocarbon into the exhaust system upstream of the CSF (either directly into exhaust gas downstream of an exhaust manifold or by injecting fuel into one or more engine cylinder during an exhaust stroke) so that the injected hydrocarbon is combusted on the filter catalyst thereby to increase the temperature of the filter in order to combust the soot. Such prior art filter regeneration can involve the exhaust gas composition becoming rich, i.e. lambda<1. In an embodiment according to the present invention, any enriching of the exhaust gas to promote filter regeneration is such that the exhaust gas is not made rich, i.e. in use the system operates lean substantially continuously, i.e. lambda>1.

Where the NO reduction catalyst is a SCR catalyst using nitrogenous reductant, the SCR catalyst can be any catalyst that can catalyse the reduction of $NO_x$ to $N_2$. Suitable catalysts include vanadium-based catalysts, e.g. $V_2O_5$/$WO_3$/$TiO_2$, or transition metal exchanged zeolites, such as iron/beta-zeolite or non-vanadium base metal SCR catalysts such as Fe—$WO_x$—$ZrO_2$.

In a particular embodiment, the particulate filter catalyst is the SCR catalyst, i.e. the filter comprises an extruded-type SCR catalyst or the catalyst is coated on the filter substrate monolith. Alternatively, or in addition, the SCR catalyst is disposed on a separate substrate located downstream of the particulate filter.

The reductant for use in the system or method according to the invention is a suitable hydrocarbon reductant, nitrogenous reductant or hydrogen. In arrangements employing hydrocarbon reductant in the preferred use of the system according to the invention, the hydrocarbon reductant can be a hydrocarbon fuel that powers the engine. Where the reductant is a hydrocarbon fuel, it may be desirable to crack the fuel to form shorter chain hydrocarbons in order to promote more efficient $NO_x$ reduction. In this regard, Pd/$CeO_2$ is a particularly efficient catalyst for cracking hydrocarbon fuel.

Nitrogenous reductants can include ammonia per se, hydrazine or an ammonia precursor selected from the group consisting of urea (($NH_2$)$_2$CO), ammonium carbonate, ammonium carbamate, ammonium hydrogen carbonate and ammonium formate. Hydrogen can be generated in situ for example by contacting a hydrocarbon fuel with a suitable reformer catalyst or, where the gas comprises carbon dioxide and water, by contacting the gas stream with a suitable water-gas shift catalyst.

The system can comprise means for controlling the introduction of reductant into the exhaust gas in order to reduce $NO_x$ therein. In one embodiment, the control means comprises an electronic control unit; optionally an engine control unit. Furthermore, the control means may comprise a $NO_x$ sensor located downstream of the NO reduction catalyst.

According to a further aspect, the invention provides a lean-burn internal combustion engine comprising an exhaust system according to the invention. The lean-burn internal combustion engine can be a lean-burn gasoline or a diesel engine, but the engine may also run on alternative fuels such as liquid petroleum gas, natural gas or comprise bio-fuels or gas-to-liquid products.

In a particular embodiment, the engine is operated continuously lean. By "continuously lean" we intend to embrace systems including a filter that is regenerated relatively infrequently by contacting the filter with increased quantities of hydrocarbon and/or carbon monoxide. This is in contradistinction to the arrangement disclosed in EP 560991, wherein the engine is operated relatively frequently rich to reduce $NO_x$ held on the $NO_x$ adsorber, or to the arrangement disclosed in EP 1559892, wherein $NO_x$ held on the $NO_x$ adsorber is reduced to $NH_3$ by enriched exhaust gas. Furthermore, the system according to an embodiment for use in the present invention employing nitrogenous reductant includes a reductant injector upstream of the SCR catalyst, whereas the system of EP '892 relies on $NH_3$ reductant generated in situ.

In another embodiment, the engine is not a compression ignition engine wherein substantially all fuel for combustion is injected into a combustion chamber prior to the start of combustion, as is disclosed in WO 2004/025096.

In a further embodiment, the engine is not a compression ignition engine operable in a first, normal running mode and a second mode producing exhaust gas comprising an increased level of carbon monoxide relative to the first mode and means when in use to switch engine operation between the two modes, as is disclosed in WO 2004/025093.

For the avoidance of doubt, the entire contents of all documents cited herein are incorporated herein by reference.

Figure 1:
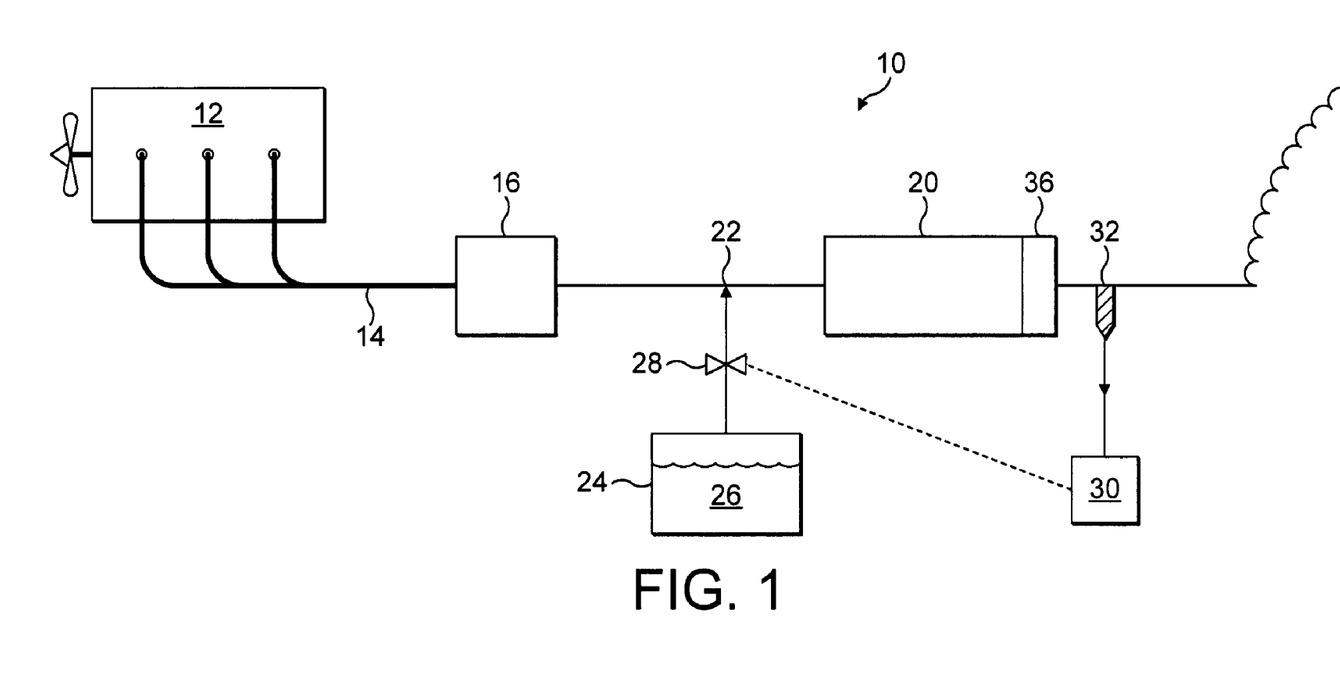
FIG. 1 is a schematic diagram of a vehicular lean-burn internal combustion engine comprising an exhaust system according to a first embodiment of the invention featuring a thermally regenerable NO adsorbent.

Referring to FIG. 1, there is shown a diesel engine 12 comprising an exhaust system 10 according to the present invention featuring passive (thermal) regeneration of NO adsorbent 16. The exhaust system comprises an exhaust line 14 wherein aftertreatment components are disposed in series. The NO adsorbent 16 comprises a ceramic flow-through substrate monolith coated with a NO adsorbent composition comprising palladium supported on ceria that net adsorbs NO from lean exhaust gas at below about 200° C. and net desorbs NO in lean exhaust gas at temperatures of about 200° C. and above.

An Fe—WOx-$ZrO_2$ SCR catalyst 20 also coated on a ceramic flow-through substrate monolith is disposed downstream of NO adsorbent 16. An $NH_3$ oxidation clean-up or slip catalyst 36 is coated on a downstream end of the SCR catalyst monolith substrate. Alternatively, the $NH_3$ slip catalyst can be coated on a separate substrate located downstream of the SCR catalyst (not shown). Means (injector 22) is provided for introducing reductant fluid (urea 26) from reservoir 24 into exhaust gas carried in the exhaust line 14. Injector 22 is controlled using valve 28, which valve is in turn controlled by electronic control unit 30 (valve control represented by dotted line). Electronic control unit 30 receives closed loop feedback control input from a $NO_x$ sensor 32 located downstream of the SCR catalyst.

In use, the palladium supported on ceria NO adsorbent 16 net adsorbs $NO_x$ in the exhaust gas at temperatures of below about 200° C. At exhaust gas temperatures of about 200° C. and above the NO adsorbent 16 net desorbs NO. NO that is emitted from the NO adsorbent is reduced on the SCR catalyst 20 in the presence of ammonia derived from urea injected via injector 22. The $NH_3$ slip catalyst 36 oxidises $NH_3$ that would otherwise be exhausted to atmosphere.

Figure 2:
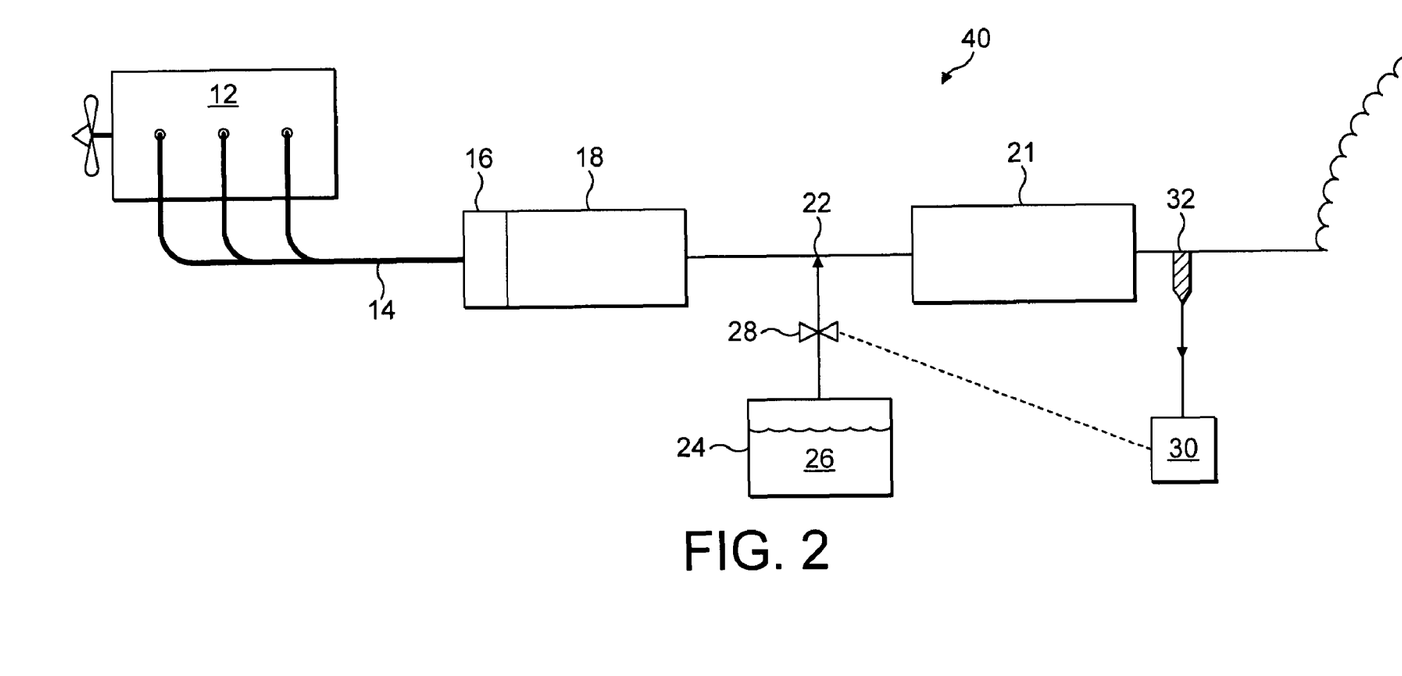
FIG. 2 is a schematic diagram of a vehicular lean-burn internal combustion engine comprising an exhaust system according to a second embodiment of the invention also featuring a thermally regenerable NO adsorbent.

FIG. 2 depicts a second embodiment of the exhaust system 40 of the present invention, in which features sharing a common reference numeral to FIG. 1 identify the identical feature. In the second embodiment, the NO adsorbent composition is coated in a zone of uniform length on an inlet end of filter substrate 18, which is a ceramic wall-flow filter. The remainder of the filter is coated with platinum on an alumina support catalyst at 25 gft$^{-3}$ platinum. The NO adsorbent composition is palladium supported on a ceria/zirconia mixed oxide. An iron/beta zeolite SCR catalyst 21 coated on a flow-through monolith substrate is disposed downstream of particulate filter 18 and means (injector 22) for introducing a reductant precursor, urea 26, into exhaust gas upstream of the SCR catalyst is located between particulate filter 18 and the SCR catalyst.

In practice, at exhaust gas temperatures of below about 200° C., NO is net adsorbed from lean exhaust gas on NO adsorbent 16. At temperatures of about 200° C. and above, NO is net desorbed from the NO adsorbent in lean exhaust gas and $NO_x$ including desorbed NO is adsorbed on the $Pt$—$Al_2O_3$ catalyst at temperatures of about 200° C. and above and below about 250° C. At about 250° C. and above, $NO_x$ is desorbed from the $Pt$—$Al_2O_3$ catalyst and some NO present in the gas stream and/or desorbed from the $Pt$—$Al_2O_3$ may be oxidised on the $Pt$—$Al_2O_3$ catalyst coated on filter 18 to $NO_2$ and particulates can be combusted in $NO_2$ on the filter. The $Pt$—$Al_2O_3$ catalyst coated on the filter also contributes to increasing $NO_2$:NO ratio in the exhaust gas downstream of the filter; it is understood that mixtures of NO and $NO_2$ are desirable for $NO_x$ reduction on a SCR catalyst as they are more readily reduced to $N_2$ (see S. Kasaoka et al. reference mentioned hereinabove).

Figure 3:
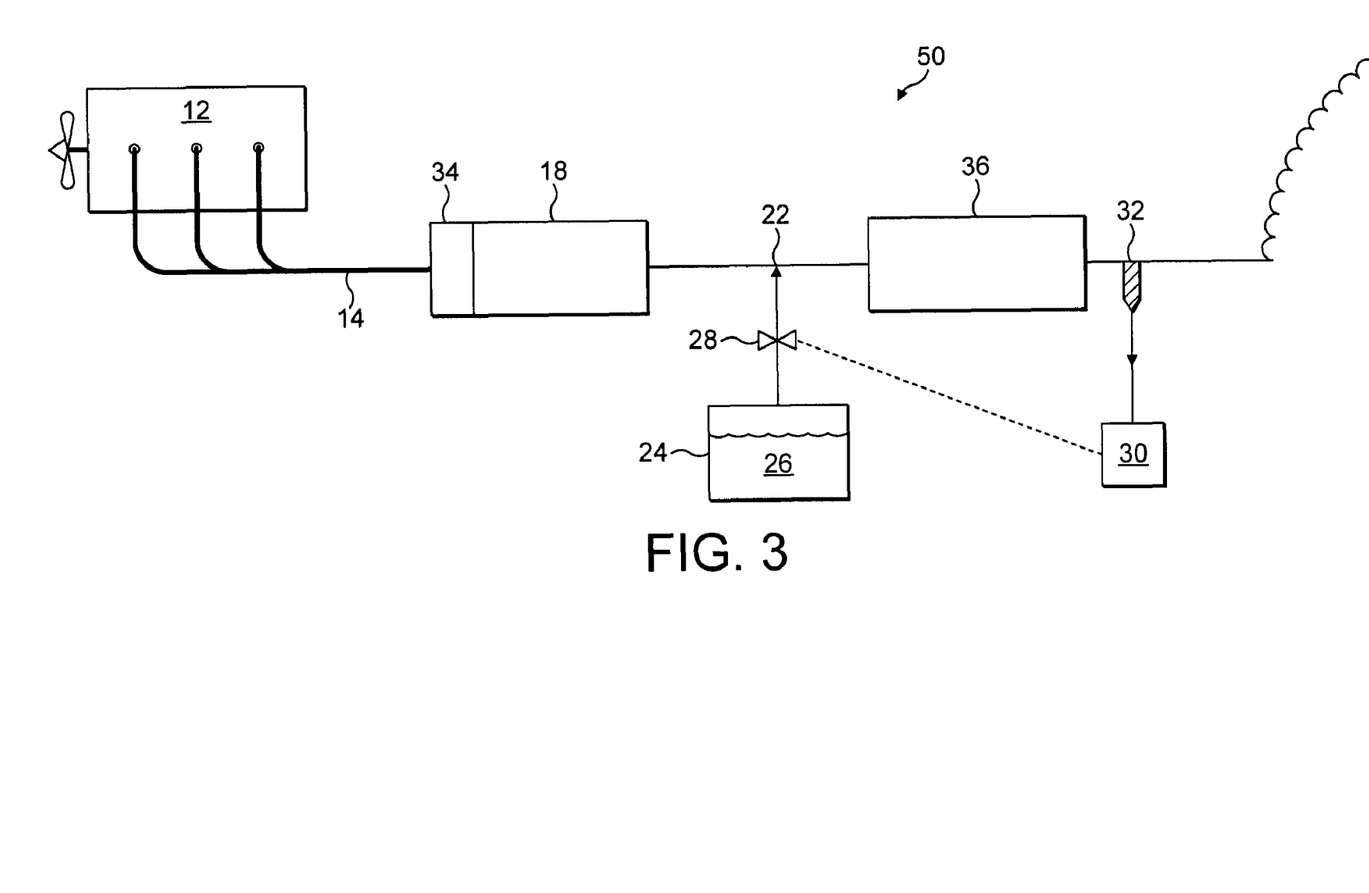
FIG. 3 is a schematic diagram of a vehicular lean-burn internal combustion engine comprising a further embodiment of an exhaust system according to the invention.

Reference numerals in FIG. 3 that are common to FIG. 2 refer to the identical feature of FIG. 2. The exhaust system 50 of the third embodiment comprises a NO oxidation catalyst zone 34 coated on an inlet end of wall-flow filter substrate 18, wherein soot trapped on the porous walls of the filter section may be combusted in $NO_2$ generated at the inlet end (see our WO 01/12320). Downstream, NO adsorbent 36 comprises a flow-through monolith substrate coated with a $Pd$—$CeO_2$/$ZrO_2$ (a mixed oxide containing both cerium and zirconium) NO adsorbent component.

Figure 4A:
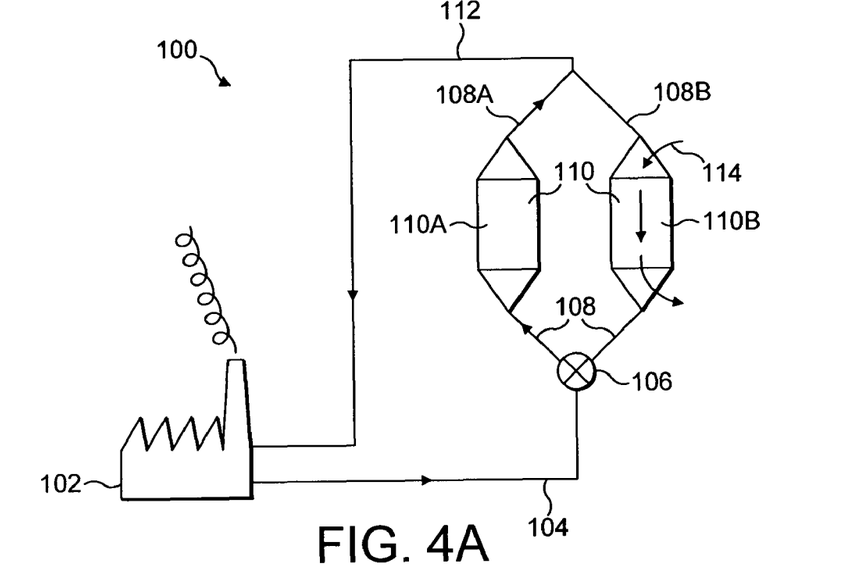
FIGS. 4A and 4B collectively show a schematic diagram of a system for use in treating NO emitted from an industrial process.
Figure 4B:
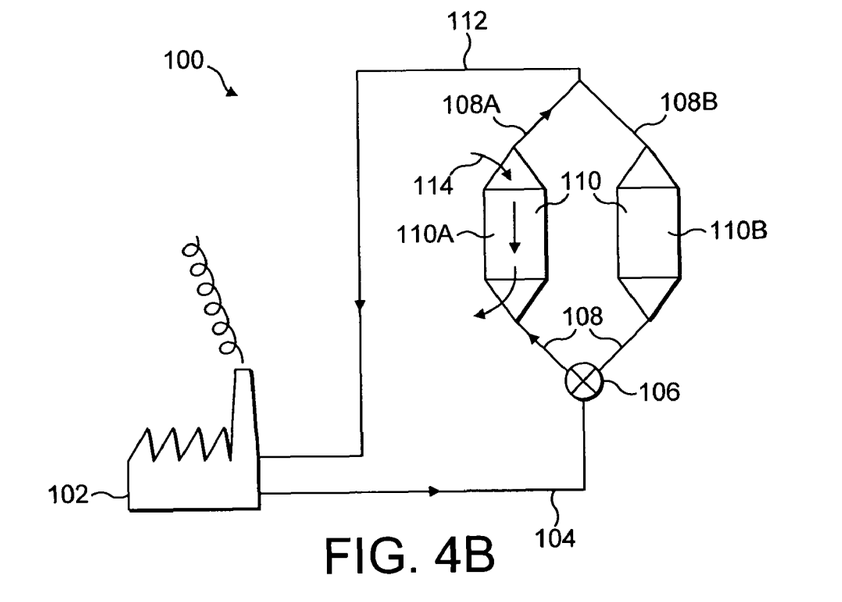

Referring to FIG. 4 generally, there is shown a circuit 100 for treating NO in gas produced by an industrial process (represented figuratively by factory 102), e.g. by gas turbines and coal- or oil-fired power plants, refining processes, by refinery heaters and boilers, furnaces, by processes of the chemical processing industry, by coke ovens, municipal waste plants and incinerators, coffee roasting plants etc.

FIGS. 4A and 4B show a circuit 100 for treating NO in gas produced by the industrial process comprising a line 104 optionally controlled by pump means (not shown) leading to a splitter valve 106 that controls gas flow between identical split lines 108. In each split line 108 is disposed a substrate monolith 110, e.g. a 50 cells per square inch metal substrate monolith coated with a NO adsorbent comprising palladium and a cerium oxide. Treated gas is returned via line 112 to be emitted to atmosphere, e.g. via a stack.

In practice, splitter valve 106 is controlled to direct the gas flow through a first of the two split lines 108A and NO present in the gas is adsorbed on the NO adsorbent at temperatures of below about 200° C. Depending on the temperature of gas entering split lines 108, it may be necessary to cool the gas e.g. using a suitable heat exchanger or water cooled jacket means so that NO may be adsorbed most efficiently. When it is determined that the capacity of the filling NO adsorbent to adsorb NO is below a required level, e.g. using a suitable $NO_x$ sensor (not shown) disposed in return line 112, splitter valve 106 is actuated to switch gas flow from the first split line 108A to a second split line 108B, so that the efficiency of the system to remove NO is maintained.

Meanwhile, the off-line NO adsorbent (110B in FIG. 4A, 110A in FIG. 4B) is regenerated using counter-current supply 114 of heated gas, e.g. air at about 200° C. and above. NO released from NO adsorbent 110 is reduced off-line using a suitable NO reduction catalyst and reductant combination.

EXAMPLES

Example 1

Impregnated Sample Preparation $Pd/CeO_2$, $Pt/CeO_2$ and $Pt/Al_2O_3$ catalysts were prepared by impregnating $CeO_2$ or gamma $Al_2O_3$ support materials with an aqueous salt solution of the relevant precious metal. The resulting product was then dried at 110° C. for 1 hour and calcined in air at 500° C. for 1 hour to arrive at a "fresh" catalyst sample. Aged samples were prepared by heating at 750° C. for 10 hours in air.

Example 2

Co-Precipitated Sample Preparation 50 g of $Pd$—$CeO_2$ catalyst with a nominal loading of 0.9 wt % Pd was prepared using $Ce(NO_3)_3$ (126 g), $Pd(NO_3)_3$ (5.57 g—assay 8.08% Pd) and solid NaOH (36 g). The NaOH was dissolved in 6 litres of de-ionised water and brought to the boil. The $Pd(NO_3)_3$ and $Ce(NO_3)_3$ were dissolved in water and made up to 500 cm$^3$ as a single solution. The resulting solution was added dropwise to the boiling NaOH solution to produce a black precipitate. The addition of the $Pd(NO_3)_3$/$Ce^{3+}$ solution usually lasted over an hour and the final pH was normally about 10. The precipitate was boiled for a further hour, filtered, and then washed free of $NO_3^-$, $Cl^-$, and $Na^+$. The washed precipitate was dried at 110° C. and then calcined in air at 500° C.

Example 3

Catalyst Core Manufacture

A washcoat of each catalyst sample of Example 1 was prepared including an appropriate quantity of an alumina binder. Cordierite flow-through substrate monoliths (400 cells per square inch, wall thickness: 6 thousandths of an inch) were coated with the washcoats which were then dried at 110° C. for 1 hour and calcined in air at 500° C. for 1 hour. One inch diameter x three inch long cores were cut from each coated substrate. Precious metal loading on the support material in Example 1 was calculated to result in a precious metal loading on the substrate monolith of 100 gft$^{-3}$.

An embodiment comprising an underlayer of aged Pd—CeO$_2$ and an overlayer of aged Pt—Al$_2$O$_3$ was prepared by coating the substrate monolith in a first pass with the Pd—CeO$_2$ followed by the drying and calcining steps and then a second pass to coat the Pd—CeO$_2$ with an overlayer of Pt—Al$_2$O$_3$, again followed by the drying and calcining steps before a catalyst core was obtained. Ageing of the bilayer was performed as described above in Example 1. The precious metal loading for each of the underlayer and overlayer was adjusted to 100 gft$^{-3}$ (i.e. 200 gft$^{-3}$ total precious metal loading for the complete bilayer).

Example 4

Sample Testing

The cores prepared according to Example 3 were inserted into a Synthetic Catalyst Activity Test (SCAT) reactor and tested using the following synthetic diesel exhaust gas mixture: 100 ppm NO (during storage period only), 0.05% CO, 4.5% CO$_2$, 250 ppm C$_3$H$_6$, 12% O$_2$, 5% H$_2$O, balance N$_2$ at a swept volume of 60,000 hr$^{-1}$. Initially, the core sample was temperature stabilised at 120° C. during a NO$_x$ adsorption phase in which the NO at inlet was switched to 100 ppm NO for 10 mins. The NO in the inlet gas was returned to 0 ppm after 10 mins, following which the temperature of the sample was increased ramp-wise for 300° C. at a rate of 20° C. per min whilst the outlet NO$_x$ was continuously detected. The procedure was repeated with a temperature "soak" at 160° C. with high NO inlet before the temperature ramp was performed, and again with temperature stabilisation at 200° C. For reasons that will become clear, the procedure was also repeated with the same gas mixture except C$_3$H$_6$ was omitted (balance N$_2$). The results are shown in FIGS. 5 to 8.

Figure 5:
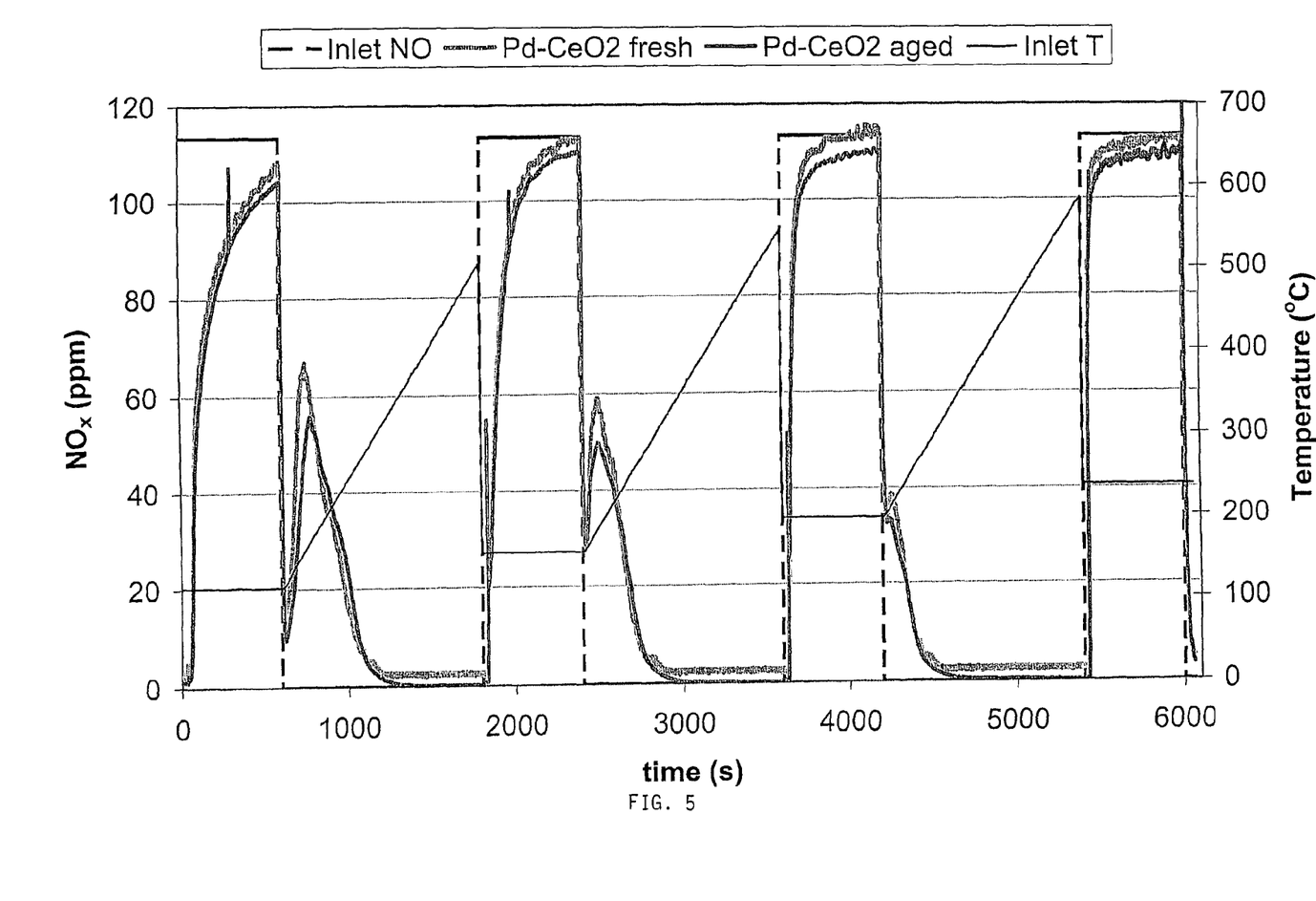
FIG. 5 is a graph plotting $NO_x$ content in the outlet gas against time for fresh and aged Pd—$CeO_2$ samples over the course of an experimental procedure described in Example 3 hereinbelow in which a synthetic lean diesel exhaust gas contains inter alia 250 ppm $C_3H_6$.

Referring to FIG. 5, it can be seen that following NO adsorption at 120° C., NO$_x$ is desorbed almost immediately as the temperature is ramped above 120° C. A similar effect is seen after NO adsorption at 160° C. and to a lesser extent at 200° C. This shows that NO$_x$ is thermally desorbed from Pd—CeO$_2$ at relatively low temperatures. It can also be seen that this effect is shared by fresh and aged Pd—CeO$_2$ samples, although the aged catalyst desorbs less NO$_x$ (though it also adsorbs less NO).

Figure 6:
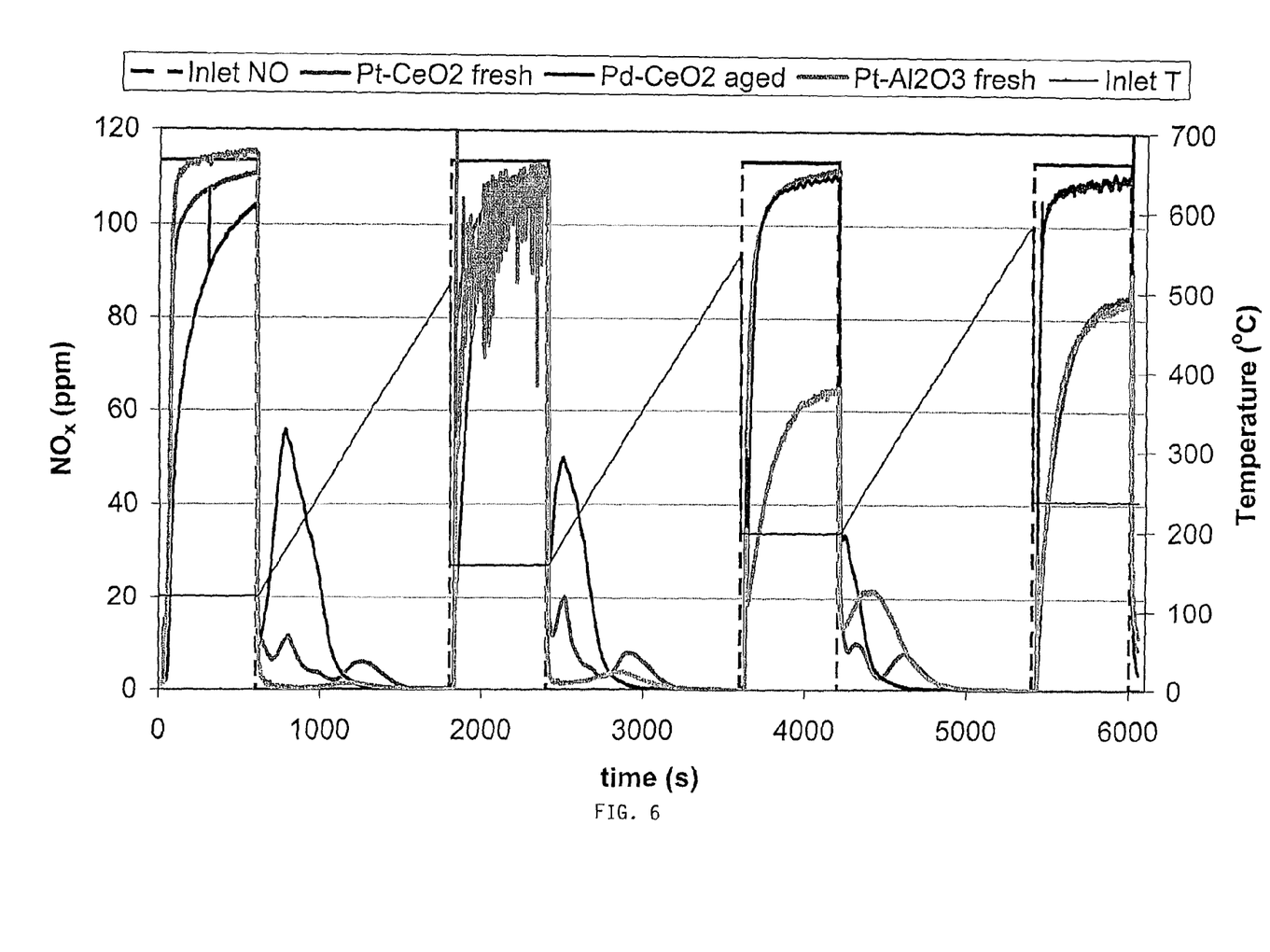
FIG. 6 is a graph plotting $NO_x$ content in the outlet gas against time for an aged Pd—$CeO_2$ sample, a fresh Pt—$CeO_2$ sample and a fresh Pt—$Al_2O_3$ sample over the course of the same experimental procedure as for FIG. 5.

Referring to FIG. 6, it can be seen that the phenomenon of thermal NO desorption for aged Pd—CeO$_2$ is significantly better than even fresh Pt—Al$_2$O$_3$ or Pt—CeO$_2$ samples for 120° C. and 160° C. data points. It can be seen from FIG. 7, however, that in the absence of C$_3$H$_6$, a NO$_x$ peak of increasing size is observed at higher temperatures for the platinum containing samples. This observation suggests that some NO$_x$ that is thermally desorbed from Pt—CeO$_2$ and Pt—Al$_2$O$_3$ is reduced by the C$_3$H$_6$ on the platinum-containing catalyst itself and possibly also during the adsorption phase so that the NO$_x$ desorption peak is reduced (lean NO$_x$ catalysis, i.e. according to the reaction {HC}+NO$_x$→N$_2$+CO$_2$+H$_2$O (some N$_2$O)), whilst for the Pd—CeO$_2$ the NO$_x$ remains and is therefore available e.g. for combustion of diesel particulate on a downstream filter, i.e. oxidation of NO to NO$_2$, e.g. using a platinum-based oxidation catalyst followed by combustion of diesel particulate in the reaction NO$_2$+C→NO+CO. This process can be adopted where a Pd—CeO$_2$ component is located upstream of a catalysed soot filter, which filter including a platinum-based catalyst such as Pt— or both Pt— and Pd—CeO$_2$/ZrO$_2$.

Figure 8:
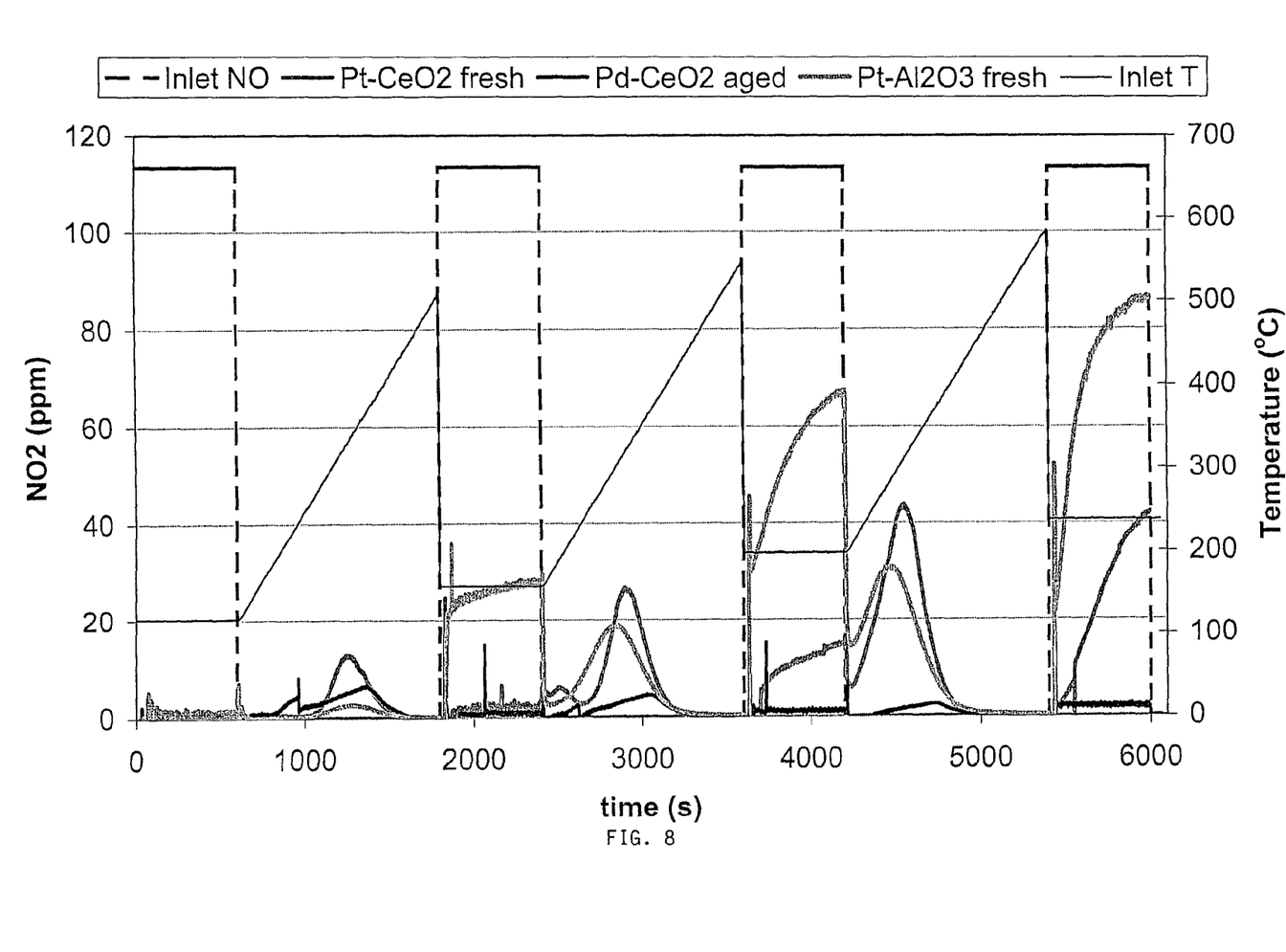
FIG. 8 is a graph plotting $NO_2$ (note nitrogen dioxide, not total nitrogen oxides) content in the outlet gas against time for an aged Pd—$CeO_2$ sample, a fresh Pt—$CeO_2$ sample and a fresh Pt—$Al_2O_3$ sample over the course of the same experimental procedure as for FIG. 7.

Referring to FIG. 8, it can be seen that in the absence of C$_3$H$_6$ a relatively small amount of NO$_2$ is thermally released from the Pd—CeO$_2$ sample, whereas increasing quantities of NO$_2$ are seen with the use of the platinum containing samples. There are three possible explanations for this observation: (i) the NO$_x$ is desorbed from the platinum-based catalysts as NO$_2$ per se; (ii) NO released from the platinum-containing catalysts is immediately oxidised to NO$_2$; and (iii) some combination of (i) and (ii). FIG. 8, by comparison with FIG. 5 or 6, also shows that NO is adsorbed by Pd—CeO$_2$ per se, because substantially no NO oxidation is observed on the Pd—CeO$_2$ catalyst over the 120° C., 160° C. and 200° C. adsorption temperature range, in contrast to the platinum-based catalysts.

Figure 7:
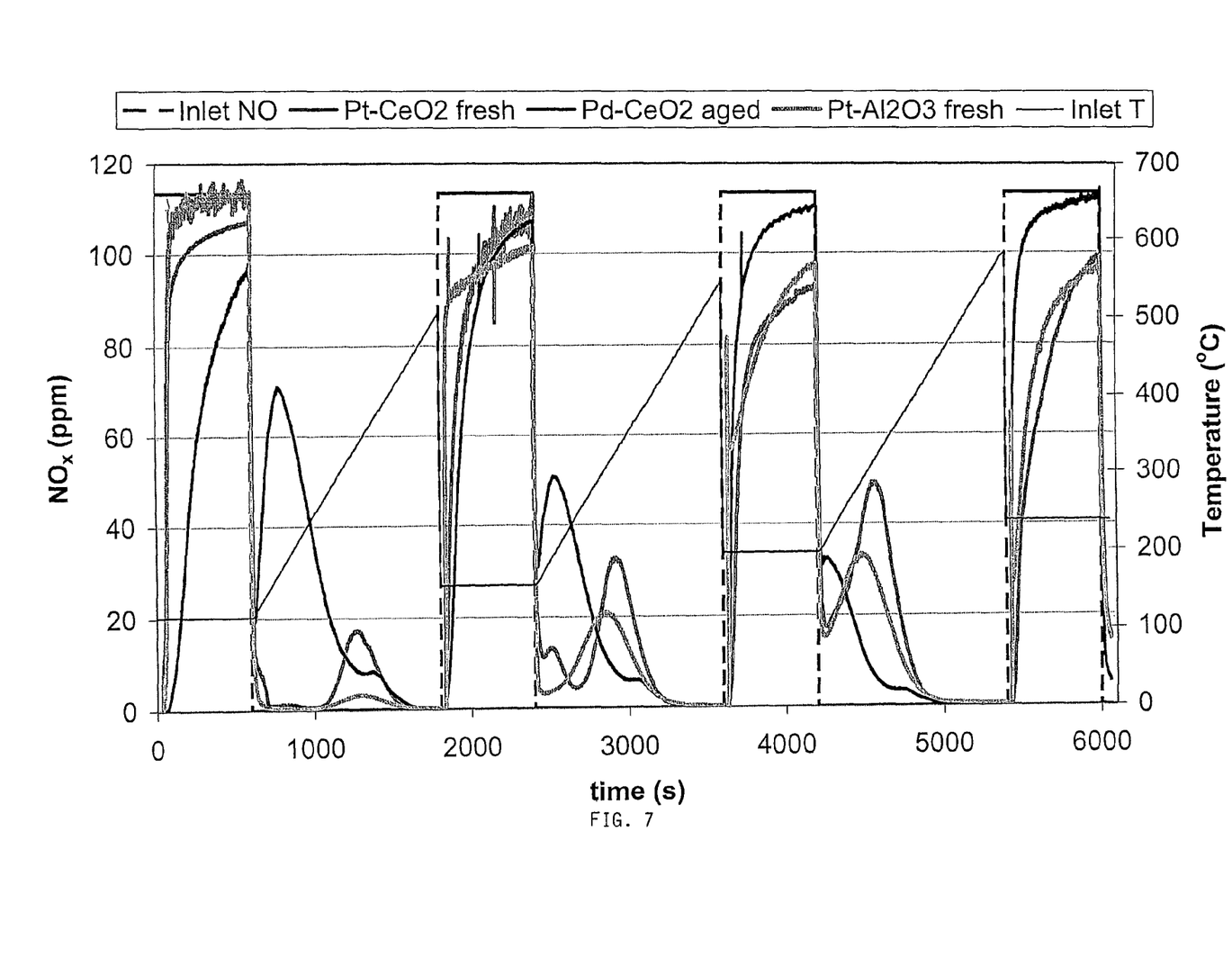
FIG. 7 is a graph plotting $NO_x$ content in the outlet gas against time for an aged Pd—$CeO_2$ sample, a fresh Pt—$CeO_2$ sample and a fresh Pt—$Al_2O_3$ sample over the course of an experimental procedure described in Example 3 hereinbelow, wherein $C_3H_6$ is omitted from the synthetic lean diesel exhaust gas.
Figure 9:
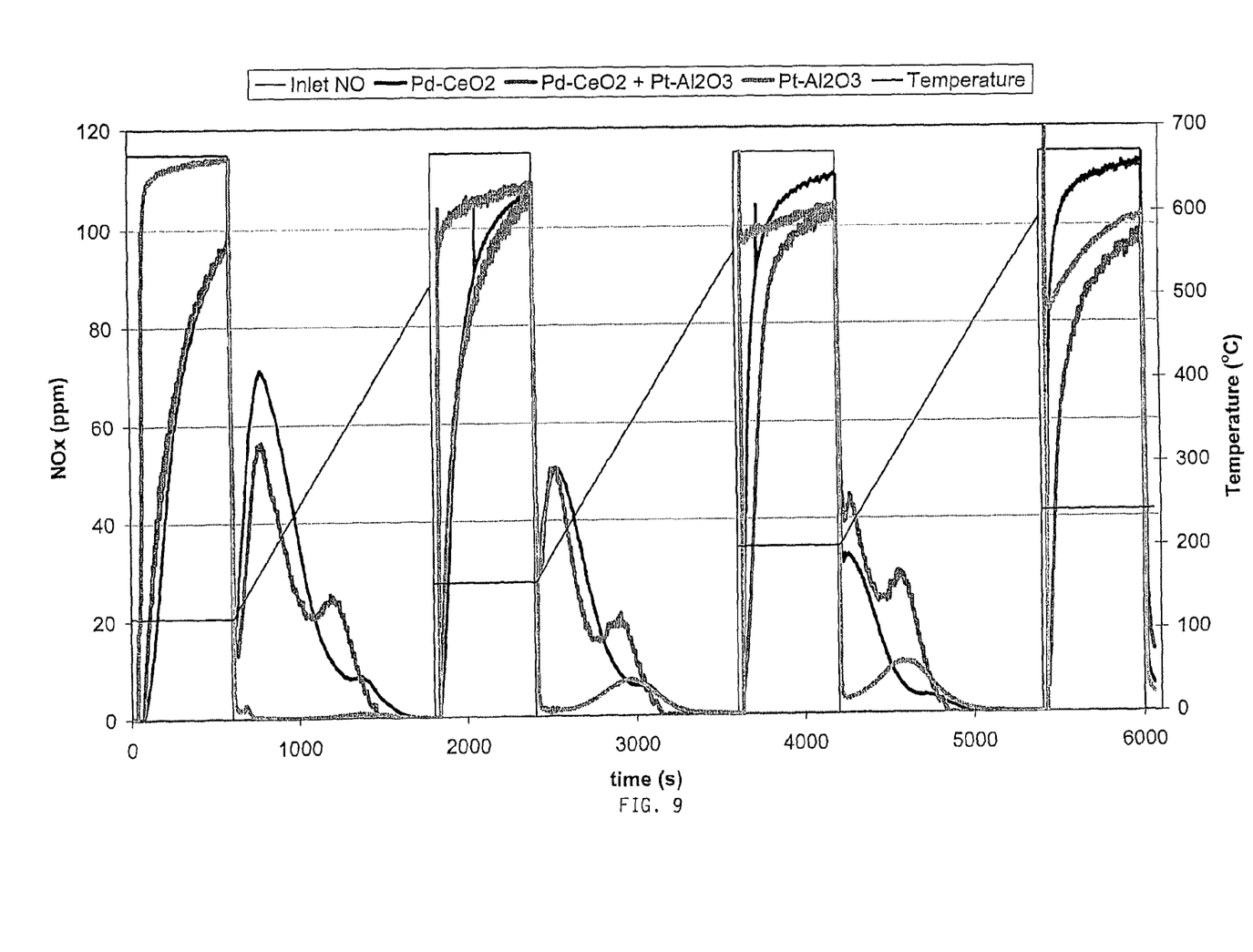
FIG. 9 is a graph plotting $NO_x$ content in the outlet gas against time for an aged Pd—$CeO_2$ sample, an aged Pt—$Al_2O_3$ sample and an aged layered catalyst combining an underlayer of the aged Pd—$CeO_2$ sample and an overlayer of the aged Pt—$Al_2O_3$ over the course of an experimental procedure described in Example 3 hereinbelow, wherein the inlet gas contains no $C_3H_6$.

Referring to FIG. 9, it can be seen that the trends seen in FIG. 7 for Pd—CeO$_2$ and Pt—Al$_2$O$_3$ are repeated at the 120° C. and 160° C. data points. However, it can also be seen that the layered catalyst achieves similar performance to the Pd—CeO$_2$ sample at the 160° C. datapoint and clearly desorbs NO$_x$ at higher temperatures than the Pd—CeO$_2$ sample at the 200° C. datapoint. Accordingly, our experiments show that in this system NO$_x$ desorption is delayed to about 250° C. and above.

The invention claimed is:

1. A method of reducing nitrogen oxides (NO$_x$) present in a lean gas stream comprising nitric oxide (NO), which method comprising the steps of:
   (i) net adsorbing NO per se from the lean gas stream in an adsorbent comprising palladium and a cerium oxide at below 200° C.;
   (ii) thermally net desorbing NO from the NO adsorbent in a lean gas stream at 200° C. and above; and
   (iii) catalytically reducing NO$_x$ on a catalyst other than the NO adsorbent with a reductant selected from the group consisting of a hydrocarbon reductant, a nitrogenous reductant, hydrogen and a mixture of any two or more thereof.

2. A method according to claim 1, wherein the NO adsorbent consists of palladium and a cerium oxide or a mixed oxide or a composite oxide containing cerium and at least one other transition metal.

3. A method according to claim 1, wherein the NO adsorbent includes palladium dispersed on ceria or a mixed oxide or a composite oxide containing cerium and at least one other transition metal.

4. A method according to claim 1, wherein the NO adsorbent is combined with a thermally regenerable NO$_x$ adsorbent for net adsorbing NO$_x$ at 200° C. and below and net desorbing NO$_x$ at 250° C. and above, the thermally regenerable NO$_x$ adsorbent comprising platinum and a metal oxide.

5. A method according to claim 1, wherein step (ii) is done in a net lean gas stream.

6. A method according to claim 1, wherein step (iii) is done in a net lean gas stream.

7. A method according to claim 1, wherein the step (iii) catalyst is a selective catalytic reduction (SCR) catalyst and the reductant is the nitrogenous reductant.

8. A system for reducing nitrogen oxides (NO$_x$) in a lean gas stream comprising nitric oxide (NO), the system comprising an adsorbent for adsorbing NO per se from the lean gas stream at below 200° C., means for contacting the NO adsorbent with a lean gas stream at 200° C. and above thereby to desorb NO from the NO adsorbent and means for reducing NO desorbed from the NO adsorbent comprising a NO reduction catalyst and a source of reductant selected from the group consisting of a hydrocarbon reductant, a nitrogenous reductant, hydrogen and mixtures of any two or more thereof, wherein the NO adsorbent comprises palladium and a cerium oxide.

9. A system according to claim 8, wherein the NO adsorbent consists of palladium and a cerium oxide or a mixed oxide or a composite oxide containing cerium and at least one other transition metal.

10. A system according to claim 8, wherein the NO adsorbent includes palladium dispersed on ceria or a mixed oxide or a composite oxide containing cerium and at least one other transition metal.

11. A system according to claim 9, wherein the at least one other transition metal in the mixed oxide or composite oxide is zirconium.

12. A system according to claim 8, wherein the palladium loading in the NO adsorbent is from 0.1 to 200 g/ft$^{-3}$.

13. A system according to claim 8, wherein the NO adsorbent is combined with a thermally regenerable $NO_x$ adsorbent for net adsorbing $NO_x$ at below 200° C. and net desorbing $NO_x$ at 250° C. and above, the thermally regenerable $NO_x$ adsorbent comprising platinum and a metal oxide.

14. A system according to claim 13, wherein the thermally regenerable $NO_x$ adsorbent comprises platinum dispersed on alumina, ceria and/or zirconia.

15. A system according to claim 13, wherein the NO adsorbent is present in an underlayer and the thermally regenerable $NO_x$ adsorbent is present in a layer overlying the underlayer.

16. A system according to claim 8, wherein the NO reduction catalyst is a selective catalytic reduction catalyst and the reducing agent is a nitrogenous reducing agent.

17. A system according to claim 8 which is an exhaust system for a lean-burn internal combustion engine, wherein the NO adsorbent is located upstream of the NO reduction catalyst or is co-located with the NO reduction catalyst and wherein the exhaust system comprises means for introducing the reductant into an exhaust gas either between the NO adsorbent and the NO reduction catalyst or upstream of both the NO adsorbent and the NO reduction catalyst.

18. An exhaust system according to claim 17, wherein the NO adsorbent is associated with an upstream end of a particulate filter.

19. An exhaust system according to claim 18, wherein the NO adsorbent is coated on an inlet end of the particulate filter, and wherein the reductant introducing means is located downstream of the filter and the NO reduction catalyst is located downstream of the reductant introducing means.

20. An exhaust system according to claim 19, wherein the NO adsorbent is disposed on a separate substrate located upstream of the particulate filter wherein the particulate filter catalyst is the SCR catalyst.

* * * * *